(12) United States Patent
Hartman et al.

(10) Patent No.: US 6,206,376 B1
(45) Date of Patent: Mar. 27, 2001

(54) APPARATUS AND METHOD OF SEALING A VALVE AGAINST INCREASING FLUID PRESSURE

(76) Inventors: Thomas A. Hartman, 700 Capac Ct., St. Louis, MO (US) 63125; Brian T. Hartman, 2253 E. Contessa Cir., Mesa, AZ (US) 85213

(*) Notice: Subject to any disclaimer, the term of this patent is extended or adjusted under 35 U.S.C. 154(b) by 0 days.

(21) Appl. No.: 09/208,269

(22) Filed: Dec. 8, 1998

(51) Int. Cl.[7] ........................... F16L 17/00
(52) U.S. Cl. .................. 277/314; 277/611; 277/612; 277/616; 277/626; 277/638; 277/648; 251/175; 251/314
(58) Field of Search .................. 277/548, 616, 277/603, 626, 627, 630, 612, 641, 644, 650, 654, 314, 310, 309, 647, 648, 611; 251/172, 175, 317, 314

(56) References Cited

U.S. PATENT DOCUMENTS

| | | |
|---|---|---|
| 2,754,136 * | 7/1956 | Phillips . |
| 2,762,601 | 9/1956 | Clade . |
| 3,356,333 * | 12/1967 | Scaramucci . |
| 3,401,916 * | 9/1968 | Scaramucci . |
| 3,462,120 | 8/1969 | Priese . |
| 3,504,886 | 4/1970 | Hulslander et al. . |
| 3,529,619 | 9/1970 | Drewry et al. . |
| 3,563,510 | 2/1971 | Priese . |
| 3,713,660 * | 1/1973 | Luthe . |
| 3,726,503 | 4/1973 | Fawkes . |
| 3,799,501 * | 3/1974 | Hartman ........................ 251/306 |
| 4,006,883 * | 2/1977 | Hilsheimer ..................... 251/307 |
| 4,023,773 | 5/1977 | Wise . |
| 4,063,709 | 12/1977 | Lorthiois . |
| 4,202,365 | 5/1980 | Aoki et al. . |
| 4,281,817 | 8/1981 | Adams et al. . |
| 4,420,140 | 12/1983 | Gachot . |
| 4,632,360 * | 12/1986 | DeSalve ......................... 251/175 |
| 4,635,945 * | 1/1987 | Beck . |
| 4,712,768 | 12/1987 | Herr et al. . |
| 4,770,393 | 9/1988 | Hubertson . |
| 4,826,133 | 5/1989 | Hiltebrand . |
| 4,883,253 * | 11/1989 | Hashimoto et al. ............ 251/315 |
| 5,158,265 | 10/1992 | Miyairi . |
| 5,284,182 * | 2/1994 | McLennan .................. 137/614.01 |
| 5,634,626 | 6/1997 | Hartman . |

* cited by examiner

*Primary Examiner*—Anthony Knight
*Assistant Examiner*—Alison K. Pickard
(74) *Attorney, Agent, or Firm*—Howell & Haferkamp, LC

(57) ABSTRACT

A double lobed seal comprises first and second annular seals, each having a radially inwardly projecting annular lobe that engages against a sealing surface of a valve element in a valve housing to seal the valve element in its closed position. With increasing fluid pressure exerted on the dual lobe seal, the upstream seal is compressed and moves radially away from the valve element sealing surface. This movement allows the fluid under pressure to enter a void between the two annular seals. The increasing fluid pressure in the void exerts a compressive force on the downstream annular seal that causes its annular lobe to move radially inwardly increasing the force of its sealing engagement with the disk valve sealing surface. In this manner, the dual lobe seal increases its sealing effectiveness when subjected to increasing fluid pressures.

18 Claims, 2 Drawing Sheets

APPARATUS AND METHOD OF SEALING A VALVE AGAINST INCREASING FLUID PRESSURE

BACKGROUND OF THE INVENTION (1) Field of the Invention

The present invention is directed to valve seals, more specifically to resilient seals for rotatable-type valves.

(2) Description of the Related Art

Rotatable-type valves are well known and are found in infinite variety. This variety is evidenced by their wide use in commerce in a multitude of applications. This type of valve is most often used in fluid piping to start and stop the flow of fluid through the piping by opening and closing the valve. The specific construction of such valves differs widely depending on the application in which they are used. Generally, however, a valve of the type involved in the present invention includes a valve housing with a center bore defining a flow passage and a hub located substantially near the middle of the length of the valve housing. The valve housing generally has at each end an orifice defined by the flow passage, although there may be more if a specific application so requires. One of the orifices is an inlet port and the other is an exit port. Usually, these ports have a common axis and are positioned 180° apart along the through axis of the flow passage.

A rotatable valve element, for example a disk valve, is pivotally disposed within the flow passage and is rotatable about an axis perpendicular to the through axis of the flow passage between an open position, in which it is generally parallel to the through axis of the valve housing, and a closed position in which it is generally perpendicular to the valve housing through axis. The rotatable valve element is mounted to a shaft, itself rotatably mounted to the valve housing at the hub with bushings or bearings. As is well known in the art, the shaft may be connected to a mechanical drive mechanism or operated manually to rotate the shaft and thereby rotate the valve element within the valve body between the open and closed positions.

The valve body has, on the interior surface of the flow passage, an internal annular groove adapted to receive and retain a seal. The internal annular groove is located so that at least a portion of the seal retained therein lies in the plane of the valve element, perpendicular to the through axis of the flow passage and located so that it will engage with the valve element in a leak-tight engagement when the valve element is rotated to its closed position. The seal may be, as is well known in the art, retained in the retaining groove by many means, including adhesives, frictional engagement, welding, and riveting.

Various types of seals have been proposed and used to seal rotatable-type disc valves. The seals of the prior art, however, at times fail to effectively seal under high pressures, do not effectively seal bi-directionally, or are unable to self adjust to increases in liquid pressure.

Thus there is a need for a valve seal that can utilize increasing pressure to more effectively seal the valve. Further in certain applications it is often desirable, if not critical, to employ rotatable-type valves in applications where liquid pressure may, at different times, flow from either direction into the flow passage. Thus, there is a need for an effective bi-directional valve seal. Still further, in many applications, in addition to the need for bi-directional sealing, it is desirable to use a seal that can effectively seal as the sealed liquid pressure increases without operator adjustment. Thus there is a need for a seal that is capable of self adjusting to increased liquid pressure to continue to effectively seal once the valve element is in the closed position.

SUMMARY OF THE INVENTION

Among the several advantages of the present invention may be noted the provision of a valve seal capable of taking advantage of the increased liquid pressure of a liquid being controlled by the valve to more effectively seal the valve; the provision of a valve seal that is bi-directional, thus able to utilize the increased pressure from liquid flowing in either direction within the valve housing while also being able to, independently, increase the seal pressure of the seal on the valve element as sealed liquid pressure increases.

Generally the present invention comprises a seal used in a valve housing containing a rotatable-type disk valve and having an internal annular groove adapted to receive the seal. The seal is comprised of two annular lobes each having an annular interior wall, an annular exterior wall and opposite annular sidewalls. Both of the annular lobes have configurations where a first of the sidewalls of each lobe engage with a side of the internal annular groove when the annular lobes are inserted into the internal annular groove. Once inserted into the internal annular groove, the second sidewalls of the lobes mutually oppose each other.

In another aspect, the invention comprises a rotatable type valve having a valve housing with a fluid passage along the through axis, a rotatable valve member and a valve seal comprised of first and second annular lobes having annular interior walls, annular exterior walls and opposite annular sidewalls. The valve housing has an internal annular groove that is adapted to receive the annular lobes with sidewalls of the annular lobes mutually opposing each other and the annular interior walls of each of the annular lobes engaging the rotatable valve member when the rotatable valve member is in a closed position. Further, the internal annular groove is dimensioned so that the opposing sidewalls of the lobes have portions with a space between them.

In yet another aspect of the invention, a method is provided to seal a rotatable-type valve having a valve housing and an internal annular groove. The method comprises the steps of providing a first annular lobe having an annular interior wall, an annular exterior wall and opposite annular sidewalls; providing a second annular lobe having an annular interior wall, an annular exterior wall and opposite annular sidewalls; and inserting the lobes into the groove so that the first annular sidewalls of each lobe engage a side of the internal annular groove. Further steps may include providing serrations on the first sidewalls and providing protrusions on the annular lobes to engage the valve member.

Other objects and features of the present invention will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
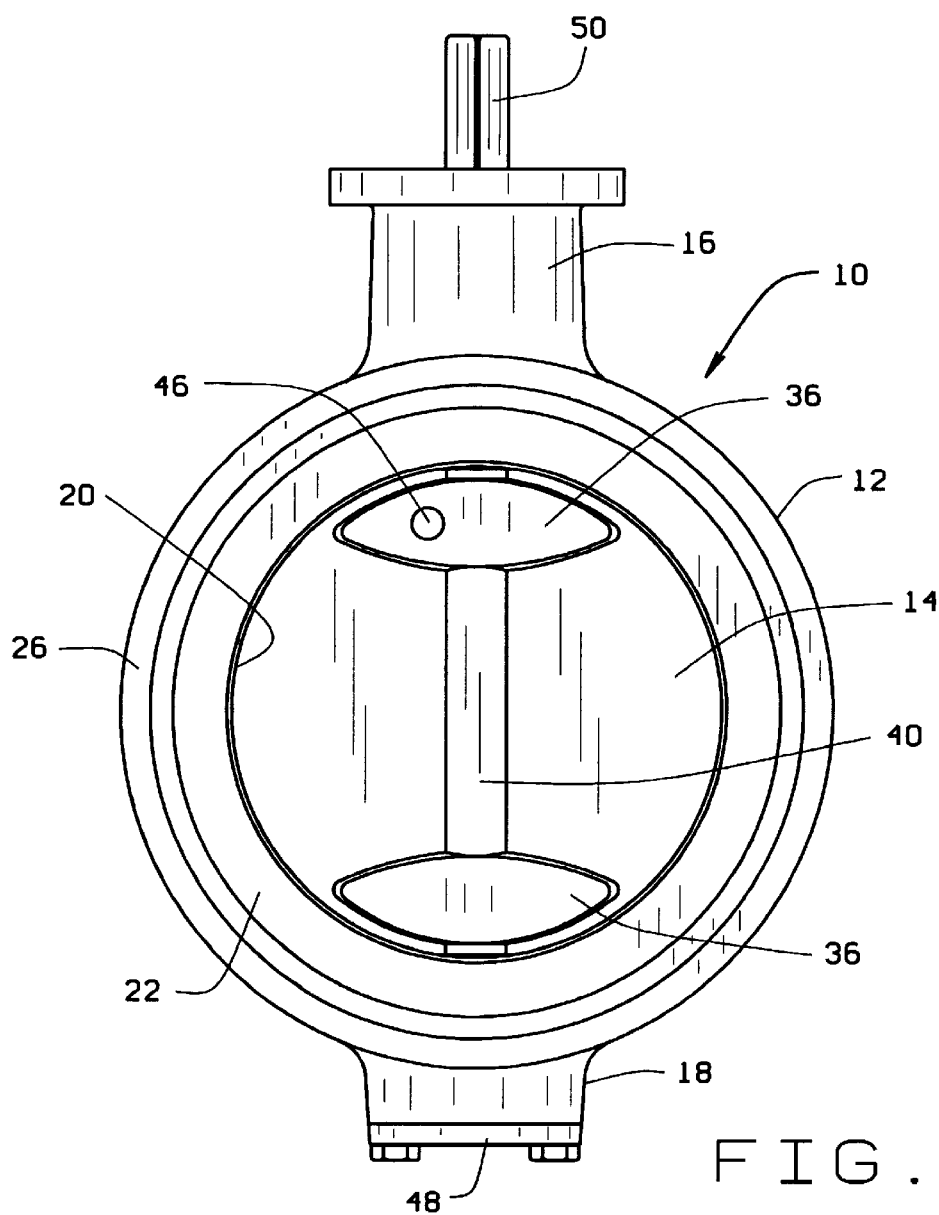
FIG. 1 is an elevation view of a typical rotatable-type valve assembly in the closed position.
Figure 2:
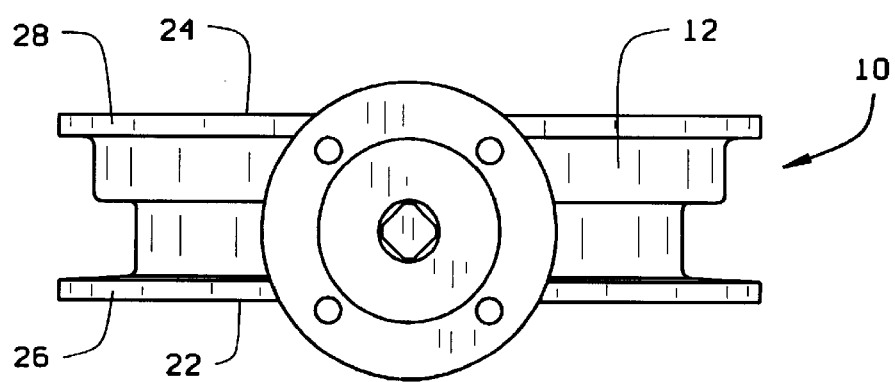
FIG. 2 is a top plan view of the valve of FIG. 1.

FIGS. 1 and 2 show a rotatable disk valve in a valve housing that is one operative environment in which the dual lobe seal of the invention may be employed. However, the environment of the invention shown in FIGS. 1 and 2 is only one example as to how the dual lobe seal of the invention may be employed and the environment should not be interpreted as the only environment in which the dual lobe seal may be employed. For example, the dual lobe seal may also be employed in a rotatable ball valve housing or a valve housing of another similar type. Therefore, the operative environment to be disclosed should not be interpreted as limiting the scope of the invention.

The rotatable disk valve assembly 10 shown in the drawing figures includes a valve housing 12 and a disk valve 14 mounted in the housing for pivoting movement of the disk valve between open and closed positions of the valve. Because the disk valve assembly 10 is only one environment in which the dual lobe seal of the invention may be employed, and because its construction for the most part is conventional, it will only be described generally herein.

The valve housing 12 is cylindrical except for an upper shaft hub 16 and a lower shaft hub 18 that project from radially opposite ends of the housing exterior surface. A generally cylindrical interior bore surface 20 passes through the valve housing from an upstream end 22 to a downstream end 24 of the housing. As viewed in FIG. 3, the upstream end 22 of the interior bore is at the left side of the housing and the downstream end 24 of the bore is at the right side of the housing. However, as will be explained, in the operation of the double lobe seal of the invention, the flow of liquid through the valve housing 12 can be reversed with the right hand end of the valve housing shown in FIG. 3 being the upstream end and the left hand of the valve housing being the downstream end. The housing exterior surface is provided with a circular upstream flange 26 and a circular downstream flange 28. The flanges are employed in connecting the valve housing 12 between adjacent upstream and downstream lengths of pipe. As is conventional, the housing can be connected between the two lengths of pipe by threaded fasteners inserted through aligned holes of the flanges 26, 28 of the valve housing and mating flanges of the upstream and downstream lengths of pipe. Alternatively, and depending on the size of the particular valve assembly 10 with which the invention is used, connections between the valve housing 12 and adjacent lengths of pipe can be accomplished with complementary threaded connectors and other known means of connecting pipe to valve housings. An upper section of a shaft hole 30 passes through the upper shaft hub 16 and a lower section of a shaft hole 32 passes through the lower shaft hub 18. Positioned just downstream from the shaft holes is an internal annular groove 33 formed in the bore interior surface 20 and extending completely around the bore interior surface.

Figure 3:
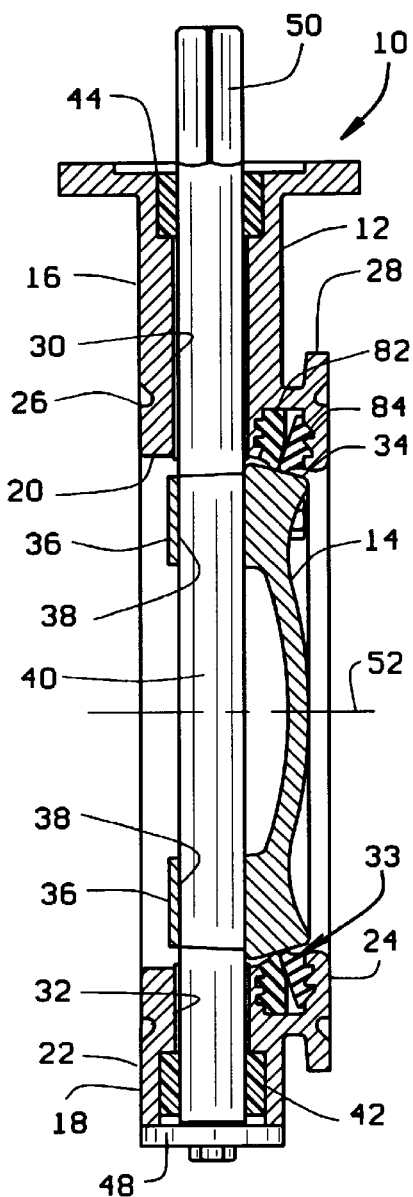
FIG. 3 is a cross-sectional view of the valve of FIG. 1 and the seal of the present invention with the valve in the closed position.
Figure 4:
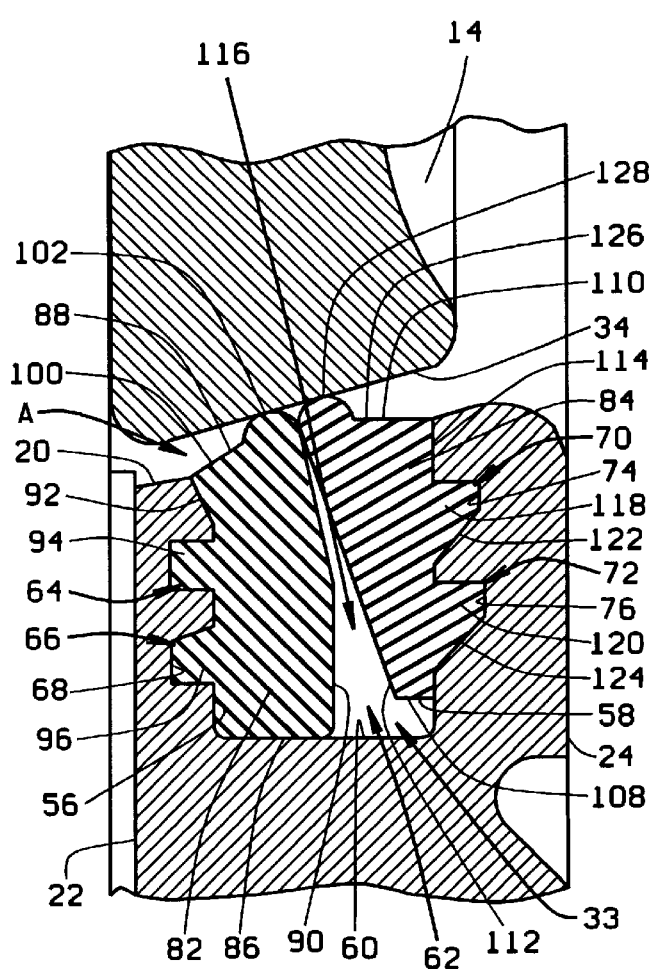
FIG. 4 is a partial, cross-sectional view of the valve seal of the present invention.

The disk valve 14 has a circular configuration with a cylindrical sealing surface 34 extending around the periphery of the valve. A pair of ridges 36 extend across an upstream face of the valve. Aligned shaft holes 38 extend through the ridges. A shaft 40 passes through the upper section of the shaft hole 30 in the upper shaft hub 16, through the pair of shaft holes 38 in the valve element ridges 36, and into the lower shaft hole section 32 in the lower shaft hub 18 of the valve housing. The lower end of the shaft 40 is received for rotation in a pivot bushing and seal assembly 42 represented at the bottom of the lower section of the shaft hole 32. The opposite end of the shaft 40 is received in a pivot bushing and seal assembly 44 represented at the top of the upper section of the shaft hole 30. Referring to FIG. 1, a key pin 46 passes through a hole in the upper disk valve ridge 36 and into a notch (not shown) in the shaft 40 securing the disk valve element 14 and the shaft 40 together. A circular flange 48 is secured to the lower shaft hub 18 over the lower bushing and sealing assembly 42. A stub portion 50 at the opposite end of the shaft 40 projects from the upper shaft hub 16 of the valve housing. An actuator of any known type, either manually operated or mechanically operated, is connected to the stub shaft 50 and is operated to rotate the shaft and the attached valve element 14 between their opened and closed positions. A closed position of the valve element 14 relative to the valve housing 12 is shown in FIGS. 1, 3 and 4. In this position, the valve element 14 is positioned generally perpendicular to the center axis 52 of flow through the center bore 20 of the valve housing. To completely open the valve element 14, the shaft 40 and attached valve element 14 are rotated 90° by the actuator (not shown) positioning the disk valve element 14 generally parallel to the axis 52 of fluid flow through the bore 20 of the valve housing.

The construction of the disk valve assembly 10 to this point is for the most part conventional and many of the described component parts and the features of their construction can be found in many different types of known valve assemblies. However, the construction of the valve assembly has been modified to accommodate the dual lobe seal of the invention, as will be described hereafter.

The construction of the internal annular groove 33 in the interior bore surface 20 of the valve housing 12 is modified to accommodate the dual lobe seals of the invention. FIG. 3 shows a cross-section of the internal annular groove 33 and FIG. 4 shows the detail of the groove construction. Referring to FIG. 4, the groove is formed with an upstream sidewall 56, a downstream sidewall 58 and a bottom wall 60, all of which extend completely around the cylindrical bore interior surface 20 of the valve housing. Together, the groove bottom wall 60, upstream side wall 56 and downstream side wall 58 surround and define a void or volume 62 of the groove.

As shown in FIG. 4, formed into the upstream sidewall 56 of the groove is an inner annular slot 64 and an outer annular slot 66. The inner annular slot 64 is positioned radially closer to the flow axis 52 of the valve housing bore and radially closer to the interior surface 20 of the bore. The outer annular slot 66 is positioned radially further away from the flow axis 52 and the interior surface 20 of the valve housing bore. The cross-section of the inner annular slot 64 is generally square where the cross-section of the outer annular slot 66 is shaped as a trapezoid with the area of the bottom face 68 of the slot 66 being smaller than the area of the opening of the slot into the volume 62 of the annular groove. This configuration of the outer slot 66 facilitates the insertion of one of the lobes of the seal as will explained.

The downstream sidewall 58 of the annular groove also has an inner annular slot 70 and an outer annular slot 72 formed therein. However, the cross-sections of both of the slots are generally trapezoidal with the bottom faces 74, 76 of the respective slots having smaller areas than the openings of the slots into the annular groove. This also facilitates in the insertion of a second lobe of the seal into the annular groove as will be explained.

The dual seal of the invention is comprised of a first annular lobe seal 82 and a separate second annular lobe seal 84, both of which are shown in FIGS. 3 and 4. As shown in these drawing figures, the first lobe seal 82 is positioned upstream of the second lobe seal 84. However, as stated earlier, a description of upstream and downstream positions are for illustrative purposes only and the dual seal of the invention is capable of functioning to seal closed the disk valve element 14 regardless of the direction of liquid flow through the valve housing bore 20. Both seals 82, 84 are constructed of a resilient, compressible material of the type typically used in valve seals. However, due to the construction of the dual seals where they are completely separate from each other and due to the functioning of their dual annular lobes to be described, the dual lobe seal of the invention is capable of sealing closed the disk valve element 14 against a substantial fluid pressure force exerted against the seals.

The first annular seal 82 is constructed with a generally cylindrical exterior surface 86, a generally cylindrical surface 88 surrounding a center opening of the seal, a circular inside wall 90 that in the first seal is facing in the downstream direction, and a circular outside wall 92 that is facing in the opposite upstream direction. The inside wall 90 is referred to as being "inside" because it faces the second seal 84 or the inside of the dual seal combination where the outside wall 92 faces away from the dual seal combination. As seen in FIG. 4, the configurations of the surfaces and walls of the first seal 82 are determined to complement the configurations of the bottom wall 60 and upstream sidewall 56 of the annular groove. With the first seal inserted in the annular groove, the exterior surface 86 mates against the annular groove bottom wall 60. The outside wall 92 is provided with an inner circular serration or ridge 94 that is shaped complementary to the inner annular slot 64 in the upstream side wall 56 and an outer circular serration or ridge 96 that is shaped complementary to the outer annular slot 66 in the upstream sidewall 66.

With the annular groove empty, the first annular seal 82 is assembled into the groove. With ample room for the seal 82 in the void 62 of the annular groove, the seal can be positioned in the groove and then pressed to the left as shown in FIG. 4 in order to insert the inner circular ridge 94 and outer circular ridge 96 into the inner annular slot 64 and outer annular slot 66, respectively. The generally square configuration of the inner circular ridge 94, being closer to the axis 52 and the valve housing interior bore 20, can be easily press fit into the inner annular slot 64. The trapezoidal configuration of the outer circular ridge 96 enables it to be easily inserted into the outer annular slot 66 even though it is positioned deeper into the annular groove 33 and its access is more difficult.

The interior surface 88 of the first annular lobe seal is divided into two sections. These include a cylindrical flat surface section 100 and a circular rim or lobe 102 that projects radially into the center opening of the first seal 82. As best seen in FIG. 4, the annular rim or lobe 102 projects radially inwardly toward the center flow axis 52 of the valve housing from the cylindrical flat surface section 100 of the first seal interior surface 88.

The inside wall 90 of the first seal 82 angles away from the second seal 84 inserted into the annular groove as it extends from the rim lobe 102 to the exterior surface 86 of the first seal. The purpose for this configuration will be described below.

The second annular lobe seal 84 has a configuration similar to that of the first seal. The second seal 84 also includes a generally cylindrical exterior surface 108, a generally cylindrical interior surface 110, a circular inside wall 112 and a circular outside wall 114. Unlike the first seal, the dimensions of the second seal are such that the exterior surface 108 does not reach and engage against the bottom wall 60 of the annular groove. In addition, the area of the exterior surface 108 is substantially smaller than that of the first seal 82, and therefore a spacing 116 is created between the first and second seals 82, 84 between their respective exterior surfaces 86, 108 and inside walls 90, 112.

An inner circular serration or ridge 118 and an outer circular serration or ridge 120 are formed on the outside wall 114 of the second seal in a similar manner to that of the first seal. However, the inner and outer circular ridges 118, 120 are both formed with a trapezoidal cross-section with respective tapered surfaces 122, 124 that extend away from the outside wall 114 of the seal as they extend in a direction toward the interior surface 110 of the seal. These tapered surfaces 122, 124 of the ridges facilitate the insertion of the second annular seal 84 into the void 62 of the annular groove with the first annular seal 82 previously positioned in the void. The tapered surfaces enable the ridges 118, 120 to compress slightly and slide over the downstream sidewall 58 of the groove as the second seal 84 is inserted adjacent the first seal 82 until the ridges align with their complementary configured inner and outer annular slots 70, 72, respectively. It can be seen that the configurations given the second seal inner and outer circular ridges 118, 120 make it much easier to position the ridges in their respective slots 70, 72 with the first seal 82 in place in the annular groove than would the configurations of the inner and outer circular ridges 94, 96 of the first seal 82.

The interior surface 110 of the second seal is formed as a mirror image of the interior surface 88 of the first seal. The interior surface is provided with a flat surface section 126 and an annular rim or lobe 128 that projects radially toward the center axis 52 of the housing interior bore 20 from the flat surface section 126. The annular rim 128 of the second seal is positioned adjacent the rim 102 of the first seal and engages with the rim of the first seal when the second seal is inserted into its position in the annular groove as shown in FIG. 4.

The inside wall 112 of the second seal 84 has a configuration that causes it to taper away from the mutually opposed inside wall 90 of the first seal 82 with both the first and second seals inserted into the annular groove. This tapered configuration of the second seal inside wall 112 also facilitates in it insertion into the annular groove with the first seal 82 already in place in the groove. In addition, it contributes to the spacing 116 between the inside walls 90, 112 of the first and second seals that is an important feature in the functioning of the dual lobe seal in maintaining a seal against the disk valve element 14 when subjected to increasing fluid pressures.

The operation of the dual lobe seal is illustrated in FIGS. 3 and 4 where the disk valve element 14 is rotated to its closed position in the interior bore 20 of the valve housing. In this position, the annular lobes 102, 128 engage against the peripheral sealing surface 34 of the disk valve. In FIG. 4, the lobes are shown just engaging the sealing surface. In some applications of the dual lobe seal this engagement may be sufficient. However, in other applications the positioning of the sealing surface 34 of the disk valve element 14 relative to the lobes 102, 124 may cause the lobes to be compressed radially outwardly relative to the center flow axis 52 of the housing interior bore to affect a tighter seal. In such applications of the dual lobe valve, the compression of the lobes 102, 128 may be to the extent that the flat surface sections 100, 126 of the first and second seals may also come into contact with the sealing surface 34 of the valve element.

With the valve element closed and sealed as shown in FIGS. 3 and 4, as liquid is held back on the upstream side of the valve element the liquid pressure will increase. The sealing engagement of the lobes 102, 128 with the disk valve sealing surface 34 will be sufficient in most applications to present leakage past the valve element. However, in situations where the liquid pressure increases to a substantial level, the liquid under pressure will enter into the area A between the flat surface section 100 of the first annular seal 82 and the sealing surface 34 of the disk valve where it will still be prevented from leaking past the lobes 102, 128 of the respective first and second seals. With still further increasing liquid pressure, a force is exerted on the flat surface section 100 of the first seal 82. This pressure pushes the flat surface section 100 radially away from the center flow axis 82 of the valve housing bore, compressing the first seal 82. If the increasing pressure is sufficiently large, it can cause the first annular seal 82 to compress radially away from the flow axis 52 to the extent that the liquid under pressure can leak past the seal between the annular lobe 102 of the first seal 82 and the disk valve sealing surface 34. This would result in the liquid under pressure entering the void 62 between the mutually opposed inside walls 90, 112 of the respective first and second seals 82, 84. The increasing liquid pressure that enters the void 62 exerts a compressive force on both the inside wall 92 of the first seal and the inside wall 112 of the second seal. This increasing pressure compresses the first and second seals 82, 84 against the opposite upstream sidewall 56 and downstream sidewall 58 of the annular groove. This compression of the first and second seals 82, 84 causes the flat surface section 100 and annular lobe 102 of the first seal and the flat surface section 126 and annular lobe 128 of the second seal to move radially inwardly toward the flow axis 52 of the valve housing bore. Because the annular lobe 128 and flat surface section 126 of the second seal 84 are not acted on by the increasing liquid pressure, their radial movement toward the center flow axis 52 of the valve housing bore is greater than that of the first seal 82. By the movement of the annular lobe 128 and flat surface section 126 of the second seal 84 radially inwardly from the liquid pressure exerted on the inside wall 112 of the seal, the force of sealing engagement between the disk valve sealing surface 34 and the annular lobe 128 and flat surface section 126 of the second seal 84 is increased. In this manner, the dual lobe seal of the present invention provides a seal that has an increased capability of maintaining a sealing engagement with a valve element even when the liquid pressure to which the dual lobe seal is subjected increases substantially.

It can be seen from the configurations of the two seals 82, 84 described above that the functioning of the seals in providing increased sealing engagement of the downstream seal against the disk valve sealing surface 34 when the upstream seal is subjected to increasing liquid pressure would be the same if the right hand or second annular seal 84 were the upstream seal and the left hand or first annular seal 82 were the downstream seal. Again, the increasing liquid pressure acting on the flat surface section 126 of the second seal 84 would compress that seal radially away from the center flow axis 52 of the valve housing center bore. This would allow the increasing liquid pressure to enter the void 62 between the two seals in the same manner as described earlier. The increasing liquid pressure acting on the inside wall 90 of the first seal would cause the flat surface section 100 and annular lobe 102 of the seal to move radially inwardly toward the center flow axis 52, thereby increasing the force of sealing engagement between the surface section 100 and lobe 102 against the disk valve sealing surface 34.

While the present invention has been described by reference to a specific embodiment, it should be understood that modifications and variations of the invention may be constructed without departing from the scope of the invention defined in the following claims.

What is claimed is:

1. A seal for use in valve housings containing a rotatable valve and having an internal annular groove adapted to receive the seal, the seal comprising:
    a first annular lobe having an annular interior surface, an annular exterior surface and opposite annular walls; a second annular lobe having an annular interior surface, an annular exterior surface and opposite annular walls; and
    the first and second annular lobes having configurations where an outside wall of each lobe has serrations that will engage with a side of the internal annular groove when the first and second annular lobes are inserted into the internal annular groove and an inside wall of each lobe will mutually oppose the inside wall of the other lobe with a spacing therebetween when the first and second annular lobes are inserted into the internal annular groove.

2. The seal of claim 1, wherein:
    each of the annular lobes has an annular rim protrusion on the annular interior surface that extends radially inwardly from the interior surface and the annular rim protrusions of the annular lobes engage each other when the first and second annular lobes are inserted into the internal annular groove.

3. The seal of claim 2, wherein:
    the annular rim protrusion of the annular lobes engage the rotatable valve when the rotatable valve is moved to its closed position in the valve housing.

4. The seal as in claim 2, wherein:
    the spacing between the first and second annular lobes gets larger as the spacing extends radially outwardly.

5. The seal of claim 1, wherein:
    the serrations are tapered.

6. The seal of claim 1, wherein:
    the first lobe and the second lobe are separate from each other.

7. The seal of claim 6, wherein:
    the first and second lobes are constructed of a compressible, resilient material.

8. The seal of claim 1, wherein:
    areas of the inside walls of the first and second lobes engage with each other when the first and second lobes are inserted into the internal annular groove and areas of the inside walls of the first and second lobes are spaced from and oppose each other with a portion of an interior volume of the groove therebetween.

9. A seal for use in a valve housing containing a rotatable valve element and having an internal annular groove for receiving the seal, the groove having a bottom wall and first and second opposing sidewalls with a groove volume therebetween and with circular slots formed into the first and second sidewalls, the seal comprising:
    an annular first lobe having an annular interior surface surrounding a center opening of the first lobe, an annular exterior surface surrounding a periphery of the first lobe, an inside wall extending between the interior surface and the exterior surface and an outside wall extending between the interior surface and the exterior surface on an opposite side of the first lobe from the inside wall;

an annular second lobe having an annular interior surface surrounding a center opening of the second lobe, an annular exterior surface surrounding a periphery of the second lobe, an inside wall extending between the interior surface and the exterior surface and an outside wall extending between the interior surface and the exterior surface on an opposite side of the second lobe from the inside wall;

the first lobe and the second lobe each having a width dimension that enables insertion of the first lobe and the second lobe into the internal annular groove with the inside walls of the first and second lobes opposing each other with a portion of the groove volume therebetween; and the outside walls of the first and second lobes having circular ridges with configurations to fit into the circular slots of the first and second sidewalls when the first and second lobes are inserted into the internal annular groove.

10. The seal of claim 9, wherein:

the first lobe and the second lobe are separate from each other.

11. The seal of claim 9, wherein:

areas of the inside walls of the first and second lobes engage with each other when the first and second lobes are inserted into the internal annular groove and areas of the inside walls of the first and second lobes are spaced from each other with the portion of the groove volume therebetween.

12. The seal of claim 11, wherein:

the areas of the inside walls of the first and second lobes that engage with each other when the first and second lobes are inserted into the internal annular groove are adjacent the interior surfaces of the first and second lobes.

13. The seal of claim 9, wherein:

the first and second lobes are constructed of a compressible, resilient material.

14. The seal of claim 9, wherein:

the first lobe interior surface and the second lobe interior surface each have a flat surface section and an annular rim that protrudes radially inwardly toward the center openings of the first and second lobes from the flat surface sections of the first and second lobes.

15. The seal of claim 14, wherein:

the annular rims of the first and second lobes are adjacent the inside walls of the first and second lobes.

16. The seal of claim 14 wherein:

the annular rims of the first and second lobes engage with each other when the first and second lobes are inserted into the internal annular groove.

17. The seal of claim 9, wherein:

at least one of the circular ridges of one of the first and second lobes tapers away from the outside wall of the one lobe as it extends in a direction from the exterior surface of the one lobe toward the interior surface of the one lobe.

18. A method for sealing a rotatable-type valve having a valve housing with an internal annular groove, the method comprising the steps of:

providing a first annular lobe having an annular interior surface, an annular exterior surface and opposite annular inside and outside walls, the first annular lobe outside wall having serrations;

providing a second annular lobe having an annular interior surface, an annular exterior surface and opposite annular inside and outside walls, the second annular lobe outside wall having serrations;

configuring the outside walls of each lobe to engage a side of the internal annular groove when the first and second annular lobes are inserted into the internal annular groove;

configuring the inside walls of each lobe to partially engage with each other with areas of the inside walls opposing and spaced from each other when the first and second annular lobes are inserted into the internal annular groove; and inserting the first and second annular lobes into the internal annular groove.

* * * * *